United States Patent [19]

Cotie

[11] Patent Number: 4,547,049
[45] Date of Patent: Oct. 15, 1985

[54] COMPOSITE OPHTHALMIC LENS SYSTEM
[75] Inventor: Robert L. Cotie, Dallas, Tex.
[73] Assignee: C & H Contact Lens Inc., Dallas, Tex.
[21] Appl. No.: 528,606
[22] Filed: Sep. 1, 1983

Related U.S. Application Data

[63] Continuation-in-part of Ser. No. 241,570, Mar. 9, 1981, abandoned.

[51] Int. Cl.⁴ .................... G02C 7/02; G02C 7/06; G02C 7/08
[52] U.S. Cl. ..................... 351/159; 351/168; 351/172; 351/176
[58] Field of Search ............ 351/159, 166, 168, 172, 351/176, 177, 178; 264/1.1, 1.7, 1.8

[56] References Cited

U.S. PATENT DOCUMENTS

| | | | |
|---|---|---|---|
| 2,618,200 | 11/1952 | Clave et al. | 351/172 |
| 3,195,145 | 7/1965 | Tisher et al. | 351/167 X |

FOREIGN PATENT DOCUMENTS

| | | | |
|---|---|---|---|
| 1299573 | 6/1962 | France | 351/168 |
| 52-10742 | 1/1977 | Japan | 351/168 |
| 52-77738 | 6/1977 | Japan | 351/159 |

*Primary Examiner*—John K. Corbin
*Assistant Examiner*—Scott J. Sugarman
*Attorney, Agent, or Firm*—Thomas L. Cantrell; Stanley R. Moore

[57] ABSTRACT

A method and apparatus for a multi-element lens system which combines pre-selected radial differences of separate ophthalmic lenses with non-mating curvatures into a single, flexibly conforming laminated unit. The system comprises a primary lens element of structural rigidity and at least one additive lens having an initially non-mating curvature formed of a thin, pliable plastic for providing a complemental ophthalmic correction or addition when flexibly conformed and bonded thereto. The assembled lens is therein capable of providing virtually any optical correction or addition by the determination and application of the appropriate additive lens having the requisite radial difference. In this manner, the ophthalmic inventory of practitioners can be reduced by providing a series of additive lenses in graduated radial differences which may be bonded to any of a stock of ophthalmic lens configuration with different initial curvatures. This method allows the practitioner to define ophthalmic corrections in terms of radial differences which may then be laminated into a single lens assembly or superimposed upon existing lenses no matter what the lens curvature.

17 Claims, 9 Drawing Figures

| STRUCTURAL LENS CURVE (DIOPTERS) | | | | | | | | | |
|---|---|---|---|---|---|---|---|---|---|
| | 5.00 | 5.25 | 5.50 | 5.75 | 6.00 | 6.25 | 6.50 | 6.75 | 7.00 |
| ADDITIVE LENS (7.250) RADIAL DIFFERENCE (M/M) | OPTHALMIC CORRECTION POWER (D) OF LAMINATE ASSEMBLY | | | | | | | | |
| 3.34 | .18 | .20 | .21 | .23 | .25 | .28 | .30 | .33 | .35 |
| 4.81 | .26 | .29 | .31 | .34 | .37 | .42 | .44 | .48 | .52 |
| 6.35 | .35 | .38 | .42 | .46 | .50 | .55 | .60 | .65 | .70 |
| 7.72 | .43 | .47 | .52 | .57 | .62 | .68 | .74 | .80 | .87 |
| 9.14 | .51 | .57 | .63 | .69 | .75 | .83 | .90 | .97 | 1.05 |
| 10.40 | .59 | .66 | .73 | .80 | .87 | .96 | 1.05 | 1.13 | 1.22 |
| 11.74 | .68 | .76 | .83 | .92 | 1.00 | 1.13 | 1.20 | 1.30 | 1.41 |
FIG. 6
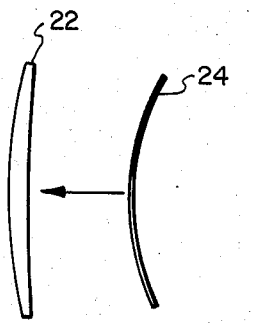 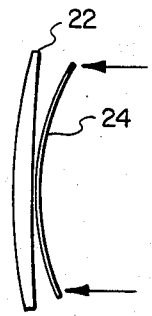 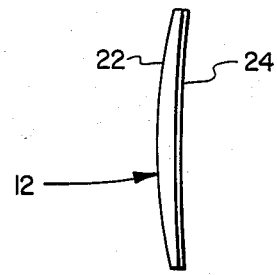
FIG. 7A     FIG. 7B     FIG. 7C

COMPOSITE OPHTHALMIC LENS SYSTEM

CROSS-REFERENCE TO RELATED APPLICATIONS

This application, in part, discloses and claims subject matter disclosed in earlier filed patent application Ser. No. 241,570 filed Mar. 9, 1981, now abandoned.

BACKGROUND OF THE INVENTION

The invention relates to a multi-element ophthalmic lens system, and more particularly, to a method of and apparatus for a multi-element laminated ophthalmic lens system comprised of a rigid primary lens and at least one thin, pliable, additive lens having an initially non-mating curvature, pre-selected because of its radial difference and flexibly bonded thereto.

It is conventional in the prior art to produce individual ophthalmic lenses having both a spherical and a cylindrical correction. The power of such lenses is generally measured in diopters (D) which is the inverse of the focal length in meters. For example, the power of the human eye, including both the cornea and lens is about +60D. Spherical lenses are generally made with powers between −7.00D and +7.00D, usually in 0.25D steps. Cylindrical lenses are made in powers up to 4.00D, also in 0.25D increments. The necessary optical corrections for the aforesaid ophthalmic lens provide an enormous stocking problem in that each configuration must be available for a complete ophthalmic inventory. An inventory of ophthalmic lenses is generally provided in a large variety of spherical cylindrical and bifocal combinations. There are approximately one hundred and twenty spherical powers, thirty cylindrical powers, and 180° of possible axial combinations which are conventionally prescribed by ophthalmic practitioners for eye glasses. Additionally, about twelve bifocal powers are generally utilized. The inventory requirements to provide immediate availability for any one of the aforesaid combinations is often times prohibitive. Therefore, the most often required lens configurations are stocked and the more seldom needed lens ordered from a lens manufacturer.

The conventional manner of fabrication of ophthalmic lenses generally includes the casting/grinding and polishing of single layer plastic or glass stock. Such fabrication techniques require expensive machinery, knowledgeable artisans and appropriate manufacturing facilities which are not readily available to individual ophthalmic practitioners. It may be seen that the complex curvatures required for combined spherical and cylindrical optic correction are accomplished by superimposing the curvature of one distinct lens onto another. Such techniques may be affected, by lens grinding machines which geometrically impose optical combinations onto a single lens blank. It is likewise possible to segregate the distinct optical patterns from one another in the lens manufacture, in that said optical patterns are initially segregated in the prescription.

The prior art has already recognized certain advantages to be gained from bonding together stock lenses for severe optical correction. One such method is shown and described in U.S. Pat. No. 4,070,105 issued to Marzouk. This reference sets forth the utilization of a Fresnel lens in a laminated configuration affording reduced thickness of the spectacle lens from what would otherwise be a relatively large spherical lens. Generally one member of the two element lens pair has a first index of refraction while a second element of the two element lens pair has a second index of refraction. By selecting the appropriate Fresnel lenses for the elements of a lens pair, each assembled lens may achieve the desired degree of spherical correction. This lens may also be made in a small laboratory without grinding or polishing.

The obvious advantage of incorporating a Fresnel lens in a laminated configuration is the provision of a thin lens assembly which affords the necessary optical correcting factors. The use of such Fresnel type lens correction has also been shown in U.S. Pat. Nos. 3,698,854 and 3,904,281, each issued to Jampolsky. In these prior art references, a thin, fully conformable, plastic membrane is applied and made to adhere with finger pressure to a conventional spectacle lens. The step quickly and permanently changes one or more optical characteristics of the spectacle lens to provide a change in the spectacle transmission across the field of view and/or the following: changing the light transmission to all colors by partial or entire occlusion with stenopaic slit, pin holes of uniform or varying size distributed either uniformly or stepwise or graded across the field, changing the light transmission either by uniform or graded diffusion, or a combination of each of the listed ways.

The subject prior art Fresnel type membrane may be embossed on one of its surfaces to form a Fresnel type lens or prism structure which introduces a deviation of the light ray for ophthalmic correction. Again the utilization of the Fresnel lens affords a distinct refractive power for ophthalmic correction in a lens assembly of reduced thickness. This construction has an additional light weight feature which benefits the user. Such a combination also reduces the manufacturing costs typical of conventional single layer lenses of the equivalent ophthalmic correction.

The use of the Fresnel membrane for ophthalmic correction is also set forth and shown in the *Journal of the American Optometric Association,* Volume 50, Number 9, 9–79. The use of the Fresnel lens laminated upon a monocular telescope system provides a telemicroscope which may also be known as a reading binocular. This reference reports the construction of such a telemicroscope utilizing plus lens Fresnel membranes as caps for the telemicroscopic systems. The advantages are multiple and include an easily constructed, inexpensive assembly with exceptional optical clarity.

The telemicroscope reference and the aforesaid ophthalmic Fresnel lens references clearly show the interest placed upon laminated lens construction by various prior art procedures. More conventional ophthalmic innovation in laminate lens construction also has surfaced for conventional ophthalmic lenses incorporating the combination for basic spherical, cylindrical and related corrections. More particularly, one laminate construction of two-ply lenses is shown in U.S. Pat. No. 1,948,636 issued to Tillyer. The lens assembly of the Tillyer patent teaches that a laminate lens construction may be provided by grinding adjacent surfaces of the laminate lenses into a mating configuration. The matingly curved surfaces are then cemented together in a non-conforming, non-flexible configuration. Such an assembly affords the advantages, however, of a laminate construction although the necessity of mating curvatures must be met.

A second prior art laminate lens construction is further set forth in U.S. Pat. No. 2,033,101 also issued to Tillyer et al. The second Tillyer patent discloses a laminate lens construction not requiring mating curvatures of bonded lenses. The lenses, however, are also not conformed to each other. In this embodiment, the lenses are cemented together along the circumferential periphery so as to seal the lens and the void therebetween. The individual lens laminates are thus rigid and structurally inflexible for facilitating circumferential bonding and the predetermined optical correction afforded by the pre-selected lens elements.

An additional prior art embodiment of a laminate lens construction is shown in U.S. Pat. No. 3,387,798 issued to Tolar. This patent teaches again pre-grinding of lenses to specific curvatures for mating. It is an object of the Tolar patent to provide a laminated, multi-focal lens assembly of improved appearance which is thin, light in weight, and strong. The laminated lens which is set forth in the Tolar patent again comprises structurally rigid, laminated lens elements. Each lens element is constructed with sufficient structural rigidity to maintain the specific mating curvature necessary for lamination. The laminate lens system set forth in Tolar then provides the ability to meet a myriad of ophthalmic corrections with a pre-selected inventory. The inventory of laminatable lenses is, however, by definition an inventory of lenses having pre-ground, mating surface curvatures and of sufficient structural rigidity to permit subsequent bonding to provide the aforedescribed thin, lightweight lens.

The inventory necessary for meeting the ophthalmic demands for laminate lens construction utilizing the above prior art approach is enormous. Although the laminate lens construction affords a myriad of benefits, the necessity for mating curvatures between bondable lenses necessitates an inventory of lens combinations which is often times not feasible. It would be an advantage, therefore, to provide a method and apparatus for an ophthalmic lens system utilizing an additive lens constructed of sufficiently thin, cross-section for flexibly conforming to any of a plurality of structural lenses. In this manner, the requisite inventory of mating lens combinations would be substantially reduced.

The present invention provides such a laminated lens system by providing a plurality of lens blanks having a series of cylindrical or spherical additive lens in graduated, radial differences for creating any given refractive power depending upon the lens curvature to which it is conformed and affixed. The flexible additive lenses of the present invention are constructed of a curvature specifically different from the curvature of the lens to which it will be bonded and are provided in graduated radial differences rather than ophthalmic powers in that the resulting ophthalmic power is determined by the specific radial difference as applied to the primary structural lens. Unlike the aforesaid prior art approaches, the present invention utilizes a thin, pliable lens which may be flexibly conformed to the structural lens, negating the need for structural rigidity in the additive lens and the necessity of pre-ground mating surfaces.

SUMMARY OF THE INVENTION

The present invention relates to an ophthalmic lens system which includes the provision of a rigid, primary lens and at least one thin pliable additive lens of basic ophthalmic design, having an initial non-mating curvature for flexible bonding thereto. More particularly, the present invention includes an additive lens system for ophthalmic use in treating varying vision deficiencies or needs of the human eye. The apparatus includes a first structural lens of predetermined optical prescription for treating a first ophthalmic deficiency. A second, additive lens of predetermined optical prescription, formed of thin, pliable light transmitting plastic is selected from a series of lenses for treating an additive eye deficiency and/or need. The series of additive lenses is provided in predetermined radial differences having initial curvatures different from that of the structural lens and with smoothly contoured surfaces to comprise a single light refracting element. The laminated lens then provides the necessary and/or refraction of the light rays transmitted to the subject eye by flexibly confirming and bonding to the structural lens to provide the pre-selected radial difference thereto.

In another aspect, the invention comprises a laminated ophthalmic lens wherein a primary spectacle lens is provided with a spherical correction of positive or negative diopter power. The additive lens comprises a thin, cylindrical lens having a pre-selected radial difference bonded to the primary lens with the necessary axial alignment. A bifocal lens may be incorporated into the primary lens.

In yet another aspect, the invention includes a method of correcting optical deficiencies of the eye in accordance with a prescription correction comprising the steps for determining a first, spherical or cylindrical correction prescription for a first optical deficiency and then determining the requisite radial difference for a second spherical or cylindrical correction to be added thereto. A plurality of structurally rigid spectacle lens blanks having a series of either cylindrical or spherical powers are provided in pre-defined graduations. A plurality of additive lenses of basic ophthalmic design having a plurality of spherical, cylindrical, or prismatic radial differences to create any given refractive power for a particular spectacle lens curvature are also provided in pre-defined graduations. Each of the additive lenses comprises a single, light refractive element formed of thin, pliable light transmitting plastic material having a curvature different from that of the spectacle lens and adapted for flexibly conforming to and bonding with one of the spectacle blanks. A first spectacle lens is then selected having the determined spherical or cylindrical correction. A second additive lens is then selected having the determined spherical or cylindrical radial difference needed for providing the desired correction when flexed into mating conformity with the first lens. The second lens is then conformed and bonded to the first, spectacle lens and the pre-selected radial difference incorporated therein. Additional additive lenses providing color, prism and surface conditioning may also be combined therewith.

BRIEF DESCRIPTION OF THE INVENTION

For a more complete understanding of the present invention and for further objects and advantages thereof, reference may now be had to the following description taken in conjunction with the accompanying drawings in which.

FIG. 6 is a radial difference chart constructed in accordance with the principles of the present invention for selection of an additive lens relative to the necessary radial difference to be applied to the specific curvature of the structural lens; and FIGS. 7(a) through 7(c) are diagrammatic illustrations of the three bonding steps of the present invention wherein an additive lens selected from the chart of FIG. 6, having an initial curvature different than that of the structural lens, is flexibly mounted thereon and bonded thereto.

DETAILED DESCRIPTION

Figure 1:
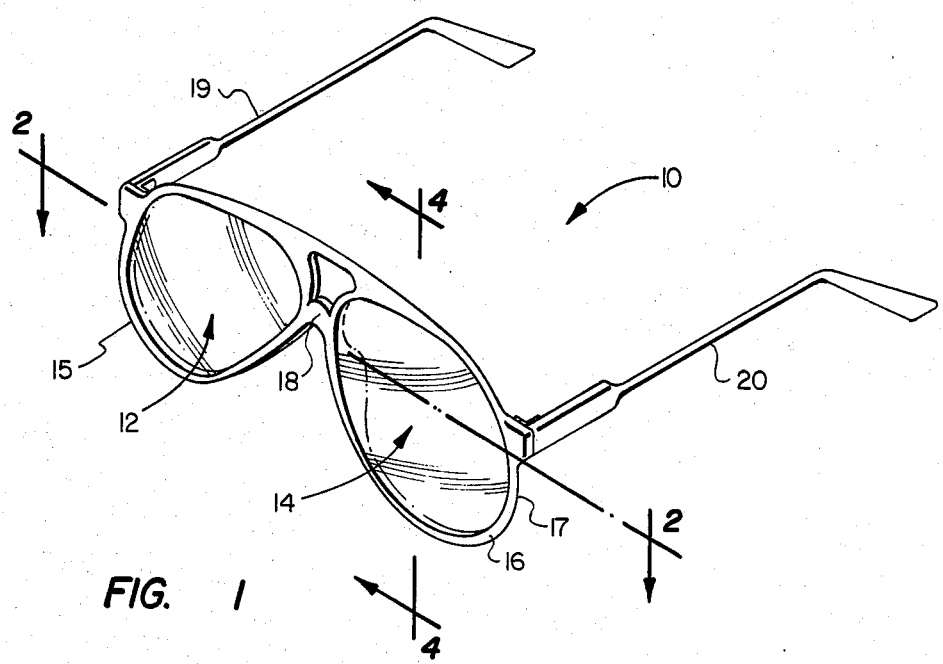
FIG. 1 is a perspective view of a pair of eye glasses incorporating one embodiment of the method and apparatus of the present invention.

Referring first to FIG. 1, there is shown a pair of spectacles, or eye glasses 10 which includes a pair of ophthalmic lenses 12 and 14 carried in a spectacle frame 16. The eye glasses 10 include a central bridge portion 18, curved rim portions 15 and 17 and side frames 19 and 20. The lenses 12 and 14 are each constructed in accordance with one embodiment of the method and apparatus of the present invention to provide an improved laminated lens system for accommodating deficiencies of the human eye.

Many types of vision impairments are successfully corrected by ophthalmic practitioners. The system of the present invention addresses the more commonly found deficiencies of the human eye with an improved approach to ophthalmic lens fabrication. One common defect of the eye is the inability of the eye to focus clearly on very distant or very close objects. This deficiency is referred to as myopic and hypermetropic, respectively. In the myopic eye, the eyeball is longer than normal which requires a spherical correction (−D). The hypermetropic eye is, likewise, too short and a positive spherical correction is needed. A third common deficiency is astigmatism in which a point source forms a line image on the retina of the eye. Astigmatism of the eye may be caused by imperfect spherical surfaces of the cornea or crystalline lens. To correct for astigmatism, an eyeglass lens is utilized that has a compensating cylindrical curvature which is properly oriented relative to the eye. A fourth common malady is the inability of the eye to accommodate for changes in distance. This condition of the eye wherein the muscles are able to add only a few diopters of power to the crystalline lens of the eye which, often through aging, becomes hypermetropic, is referred to as presbyopia. The correction is a bifocal lens. Each of these deficiencies is separately determined by an ophthalmic practitioner in an eye examination. When these deficiencies appear together, they require separate optical corrections in the corrective len. The term "bi-optical deficiencies" is used herein to refer to the existence of two or more of the aforesaid ophthalmic conditions at one time. The corrective lenses of the eye glasses or spectacles then combine the individual corrections into a single lens assembly for bi-optical correction.

Still referring to FIG. 1, the lens 12, which incorporates the corrections for bi-optical deficiencies, may thus include spherical, cylindrical, bifocal, prismatic and color corrections and additions. The prior art, as set forth in the Background of the Invention, generally provides such optical corrections by integrating the separate geometric configurations of the individual correction prescription. The integration is generally effected by either superimposing each geometric configuration onto a single lens blank which is ground and polished in accordance therewith or lamination of structurally rigid, pre-ground lens elements of mating curvature. The above has been the subject of much prior art development and interest as discussed above. The prescription integration is, however, performable as set forth herein without such complex machinery or immense inventory of pre-ground lens blanks of mating curvature. The lenses 12 and 14 of FIG. 1 will be shown to comprise the same integrated prescription as comparable lenses which are conventionally ground as laminated but assembled from non-mating elements, defined by their radial differences.

Figure 2:
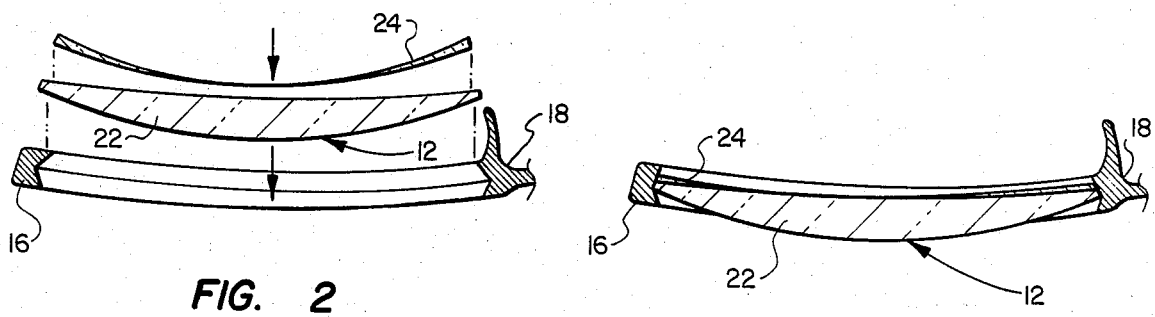
FIG. 2 is a partial, cross-sectional, exploded view of one lens of the eye glasses of FIG. 1, taken along lines 2—2 thereof.

Referring now to FIG. 2, there is shown an exploded view of the lens 12 of the present invention illustrating the construction thereof. The lens 12 may be seen to be a multi-element ophthalmic device formed by the bonding together of two lens elements of basic ophthalmic design, each providing a separately definable basic optical correction. The term basic ophthalmic design as used herein refers to fundamental optical correction elements such as spherical, cylindrical, prismatic and bifocal lenses having a smooth, continuous, optical refractive surface. These relatively low diopter, conventional eyeglass lenses are to be distinguished from the non-basic ophthalmic lens such as a Fresnel lens requiring relatively high diopter corrections.

Still referring to FIG. 2, a first or primary, structural lens 22 is provided with externally smooth surfaces, formed by conventional casting/grinding and polishing and embodies in itself all or part of the spherical or cylindrical correction needed for the lens assembly 12. In some situations, this could be a zero correction. The separate lens element 24 is a thin, pliable, additive lens provided for flexibly bonding to the primary lens element 22 (shown herein as a spherical lens) for a secondary ophthalmic correction which is shown in this Figure as a cylindrical correction. The cylindrical correction is enlarged for purposes of illustration. In some instances, this too could be a zero correction. The additive lens 24 comprises one of a series of thin, pliable plastic members provided in graduated radial differences as will be described in more detail below. The additive lens 24 is constructed of lightweight optical grade plastic of sufficient thinness to permit its flexing and mating conformance to a surface having a different curvature. Most conventional materials are too brittle for such a construction. For example, polycarbonate lenses or glass lenses, although capable of being specifically ground for mating curvatures as is conventional and prior art laminate construction, are too brittle for any sufficient degree of flexing. One example of a plastic in accordance with the principles of the present invention is CR-39 which is an ophthalmic grade plastic to which has been added polymethlmethacrylate (PMMA). Such a plastic composition would afford sufficient flexibility for conformance in bonding when constructed in sufficiently thin, cross-sectional configurations as will be described below. The use of polymethlmethacrylate (PMMA), itself, may be utilized in accordance with the principles of the present invention when coated with an appropriate scratch resistent coating with such an additive lens construction, the thickness of the primary lens 22 will not necessarily be reduced substantially beyond that of conventional lenses. The thickness of the primary lens 22 is only limited by the combined thickness of the lenses 22 and 24 and/or other additive lens elements, which by definition are substantially thin in cross-section. It should be noted that the additive lens 24 of the present invention includes not only a thin, pliable construction with a curvature substantially different from that of the primary lens, but with a smoothly formed, continuous, opposed surfaces comprising a single light refractive element.

Figure 3:
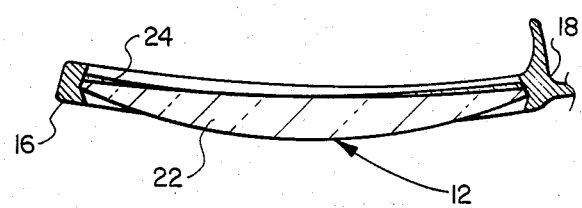
FIG. 3 is a cross-sectional view of the assembled lens of FIG. 2.

Referring now to FIG. 3, there is shown the assembled lens 12 of FIG. 2. The bi-optical lens therein formed affords the user the benefit of the spherical correction in a primary lens 22 and the necessary additive correction of lens 24. The basic additive correction of the additive lens 24 can also include color as well as other basic ophthalmic corrections. Likewise, other additive lenses may be added to the assembly to accomplish the desired result. As will be seen, these combinations are readily producible from a relatively small lens inventory of specific primary and additive configurations. Radial differences sufficient to provide spherical lens graduations on the order of 0.25D and cylindrical lens graduations on the order of 0.25D have been found to be generally acceptable. Such a method utilizing radial differences as the selection parameter for the additive lens will be seen to save an ophthalmic practitioner space, time and money and afford the user the benefit of specialized lens fabrication by the practitioner at the time of purchase.

Figure 4:
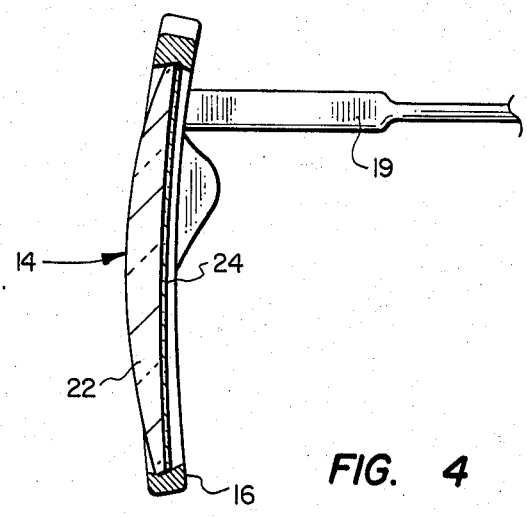
FIG. 4 is a partial, cross-sectional view of the other of the two lenses of FIG. 1 taken along lines 4—4 thereof.

Referring now to FIG. 4, there is shown a second vertical, cross-sectional of the bi-optical lens 12 of FIG. 1. It may be seen that the thickened edge portions of the flexible, cylindrical lens 24 bonded to spherical lens 22 is not seen in this particular view. This is due to the angular orientation of the lens 24 relative to lens 22 for astigmatism correction. The angular orientation is, of course, an aspect of lens assembly. The additive lens 24 is thus oriented to lens 22 during assembly and pursuant to the correction prescription.

Figure 5:
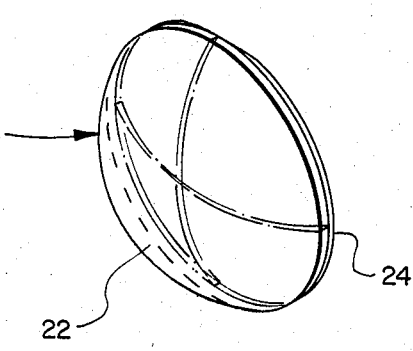
FIG. 5 is a diagrammatic, perspective view of one embodiment of an assembled lens in accordance with the principles of the present invention.

Referring now to FIG. 5, there is shown a perspective, diagrammatical illustration of an assembled, bi-optical lens 12. The additive lens 24 is shown, in phanton, bonded to primary lens 22. The angular orientation of the additive lens may be seen in more detail. Of course, the angular orientation of concern is that of the cylindrical lens 24. The cylindrical lens 24 incorporates edge portions embodying the requisite radial difference for creating the ophthalmic correction necessary for the optical prescription. Selection of the requisite lens must take into account the curvature of the surface of the structural lens 22 to which the flexible additive lens 24 will be applied. The curvatures of the back face, or bonding surface, of structural lenses will vary. Therefore, the resulting power of ophthalmic correction for the lens assembly will vary in accordance with the resulting laminate curvature of the additive lens and its radial difference. Once bonded to the spherical lens 22, the additive lens curve defined as the radial difference is distributed across the spherically curved surface of the primary lens to provide the requisite optical correction. Selection of the appropriate radial difference is then determined by knowing the curvature to which the additive lens will be applied and the necessary corrective power. Unlike prior art additive lens systems, this method and apparatus will greatly reduce the requisite inventory for the practitioner and eliminate the criticality of mating curvature tolerances.

Referring now to FIG. 6, there is shown a radial difference chart constructed in accordance with the principles of the present invention for cylindrical corrections. As shown herein, radial differences of the additive lens is charted relative to the curvature of the structural lens to which it is to be affixed with the resulting refractive power indicated therebetween. The vertical column of the chart thus shows a series of additive lenses having a pre-determined radial difference in millimeters indicated thereon. The top, horizontal section of the chart indicates the curve in diopters of the surface of the structural lens to which the additive lens will be applied. The refractive powers are then indicated in the boxes between the orthogonal reference sections.

The particular radial differences and values found in the chart of FIG. 6 are illustrative only. Any number of lens powers and radial difference combinations can be provided in a chart for utilization in accordance with the principles of the present invention. Moreover, a chart such as FIG. 6 may refer to either cylindrical or spherical powers of additive lenses as both are equally applicable. This is possible in accordance with the present invention because it is the refractive power that the ophthalmic prescription denotes, rather than radial difference. A particular value of the system of the present invention is thus the correlation of refractive power with radial difference in order to minimize the number of additive lenses necessary for supplying an ophthalmic practitioner.

Referring now to FIGS. 2 and 6 in combination, the principles of the present invention address the critical functional element of an additive ophthalmic lens assembly. There are three basic factors that create the refractive power of such an ophthalmic lens: the refractive index, the center thickness, and the difference between front and back curves of the lens. Prior art additive lenses address only the latter element by providing a pre-ground additive lens not adapted for flexibly conforming to a structural lens. It is known by those skilled in the art that flexing a lens, as shown in FIG. 2, changes the refractive power, both of the lens 24 and the assembly. However, by maintaining a pre-selected refractive index and center thickness, the resulting refractive power of a flexed lens may be established as set forth in the chart of FIG. 6. The present invention addresses specifically the manner in which conventional lenses are made and the types of ophthalmic correction necessary to meet a practitioner's need for ophthalmic prescriptions.

When an ophthalmic lens is ground, there is an effort made to maintain a back surface curve on the order of six diopters. This is not always possible, but the majority of lenses produced fall within a plus or minus one diopter range. The chart of FIG. 6 will show applicability to this range of back surface curvature. With this functional aspect addressed, the thin, pliable additive lens is then inventoried by radial difference rather than by diopters. A minus one (1) diopter on a six diopter curve does not have the same radial difference as a minus one (1) diopter on a seven diopter curve. Therefore, the prior art approach to additive lenses is strictly limited to non-flexing of the additive lens, or if there is inadvertent flexing, the refractive power is specifically changed. In accordance with the present invention, a chart, such as that shown in FIG. 6, is used to select the proper radial difference to create the desired refractive power on any given curve. In this manner, any existing lens can be modified unlike prior art approaches necessitating mating curvatures.

Referring still to FIG. 6, the data provided therein is developed as follows. It is well accepted that in the ophthalmic industry that a six diopter inside curve provides the best vision for the user. Therefore, by using the six diopter curve as the common denominator for radial difference graduations, a chart such as that of FIG. 6 can be derived by employing the formula:

$$Rd = ((I-1) \times 1000/D) - ((I-1) \times 1000/(D+P)) - (CT)/3) \quad \text{(A)}$$

where:
Rd = radial difference
I = index of refraction
D = dioptic value of the inside curve of base lens
P = final refractive power of additive lens
CT = center thickness Utilizing the above formula (A), the center column of six diopter power may be established for the most desirable refractive powers, 0.25D, 0.50D, 0.75D, and 1.0D and those powers therebetween.

With the radial differences of the additive lens known for establishing the most desirable refractive powers for a six diopter back curve, the remaining portions of the chart may be calculated by utilizing the formula:

$$P = [((I-1) \times 1000)/(((I-1) \times 1000)/D) - Rd] - D \quad \text{(B)}$$

where:
P = final refractive power of additive lens
I = index of refraction
D = dioptic value of the inside curve of base lens
Rd = radial difference The refractive power for each radial difference determined by the above formula B may then be inserted in the chart for use by an ophthalmic practitioner. The radial lenses may then be supplied in the pre-defined radial differences for bonding to the subject structural lens.

In operation, the additive lens is constructed with a curvature different from and preferably greater than that of the structural lens. Referring now to FIGS. 7(a) through 7(c), there is shown the assembly of such an additive lens to a structural lens. It is pointed out that the thickness of the additive lens is shown to be enlarged for purposes of illustration and that the relative sizes therebetween are presented in an illustrative fashion only.

Referring first to FIG. 7(a), the additive lens 24 is shown with a curvature on the order of 7.25 diopters for bonding to a structural lens having a back face curvature of six diopters. The data of radial differences provided in the chart of FIG. 6 is constructed with that pre-defined additive lens curvature, although the lens 24 and chart 6 could utilize other curvatures. As the additive lens is brought into engagement with the structural lens, the central portion of the lens 24 engages the structural lens 12 first with the edge portions conformed thereto in an outwardly radiating pattern. A conventional laminate lens bonding agent is provided between the structural and additive lens for purposes of ophthalmic bonding.

For purposes of further example of the present invention, the edge thickness of an additive lens as applied to a structural lens may be determined by addressing the sagittal depth of the lens, itself. Sagittal depth is determined by the formula:

Sagittal
$$\text{Depth}(S_D) = (\text{diameter}/2)^2 \times ((\text{INDEX}-1) \times 1000/\text{Radius})/(2(\text{INDEX}-1) \times 1000) \quad \text{(C)}$$

To find a resulting edge thickness of an additive lens having a 67.59 millimeter radius base curve, which is equivalent to a 7.25 diopter curve, radial difference of 6.35 and center thickness of 0.2 millimeters, having an index of refraction of 1.49 and a diameter of 65 millimeters, the following sagittal depths ($S_C$) may be constructed.

| | |
|---|---|
| Sagittal depth of 67.59 R = | 7.814 M/M |
| Sagittal depth of 61.24 R = | 8.622 M/M |
| 6.35 M/M | .808 M/M edge thickness |
| | .200 M/M center thickness |
| | 1.008 M/M total edge thickness |

As set forth in the calculation above, the total edge thickness for the resulting additive lens as applied to a structural lens in accordance with the present invention would be on the order of one millimeter with a 0.2 millimeter center thickness.

The above example is shown for purpose of illustration only, and many lens sizes may be utilized. What is shown is that the bending or flexing of a lens is permissible when refractive power is keyed to the radial difference afforded by the additive lens. Such computations of refractive power are within the established tolerances of the ophthalmic industry and as specifically set forth in the 1978 American National Standards Institute Z80.1. The standards for ophthalmic lenses call for a tolerance of plus or minus 0.12 diopters with one diopter of warp. As set forth above, the three fractors that create refractive power are the index of refraction, the center thickness, and the difference between the front and back curves. By maintaining the same index of refraction in the material and with a known center thickness, the only variation will be in the radial difference between the curves. Therefore, it is the object of the present invention to specify the radial difference and, by doing so, the only major area of intolerance is controlled. Unlike the prior art, the present invention addresses the specific area of the additive lens which permits flexing while maintaining the desired ophthalmic correction.

In operation, the ophthalmic prescription is analyzed, and the curvature of the structural lens to be corrected is recorded. The curvature of the back surface or bonded surface of the structural lens determines the area of use of the appropriate chart such as that shown in FIG. 6. The applicable vertical column is then selected in accordance with the back curvature of the structural lens and the nearest refractive power is located. The additive lens, having the radial difference for the appropriate refractive power, is then selected and bonded to the lens as shown in FIGS. 7(a) through 7(c). The chart of FIG. 6 illustrates cylindrical additive lenses which, when applied, will provide the construction shown in FIG. 5 of a spherical lens with a cylindrical lens bonded thereto.

It is thus believed that the operation and construction of the present invention will be apparent from the foregoing description. While the method and apparatus shown and described has been characterized as being preferred it will be obvious that various changes and modifications may be made therein without departing from the spirit and scope of the invention as defined in the following claims.

What is claimed:

1. Apparatus for ophthalmic use in treating bi-optical deficiencies of the eye in accordance with a prescription correction, said apparatus comprising:

a first structural lens of pre-determined optical prescription and surface curvature for treating a first ophthalmic eye deficiency;

a second additive lens of pre-determined radial difference affording a select optical prescription when applied to said structural lens and formed of thin, pliable light transmitting plastic material of sufficiently thin, cross-sectional area to afford pliability for flexibly conforming to said bonding surface curvature of said structural lens and having first and second opposed surfaces for treating a second ophthalmic eye deficiency;

said first opposed surface of said additive lens being smoothly formed and provided in a curvature different from and greater than the bonding surface curvature of said structural lens and bonded in flexible conforming relationship to said structural lens; and said second opposed surface of said additive lens being formed with a continuous, smoothly formed surface configuration comprising a single light refractive element having refractive properties which differ from and complement those of said first spectacle lens for bi-optical refraction of the light rays transmitted by said bonded first and second lenses to said eye in accordance with said prescription correction.

2. The apparatus as set forth in claim 1 wherein said first structural lens comprises a spherical lens having a pre-determined spherical optical correction.

3. The apparatus as set forth in claim 2 wherein said first, spherical lens comprises a negative diopter correction power for treating a myopic eye deficiency.

4. The apparatus as set forth in claim 2 wherein said first, spherical lens comprises a positive diopter correction for treating a hypermetropic eye deficiency.

5. The apparatus as set forth in claim 1 wherein said second additive lens comprises a cylindrical lens having a pre-determined cylindrical, optical correction and defined cylindrical axis.

6. The apparatus as set forth in claim 5 wherein said cylindrical lens is flexibly conformed to and bonded with said first lens with said cylindrical axis in pre-defined angular alignment relative thereto for correction of astigmatic ophthalmic conditions.

7. The apparatus as set forth in claim 1 wherein said structural lens comprises a cylindrical lens and said additive lens comprises a thin, pliable spherical lens, each having a pre-determined ophthalmic correction.

8. The apparatus as set forth in claim 1 wherein a third, additive lens of pre-determined optical prescription, formed of flexible, light transmitting plastic material is bonded to said first and second lenses for providing a third optical correction.

9. The apparatus as set forth in claim 8 wherein said third, additive lens comprises a thin, pliable prismatic lens of basic ophthalmic design.

10. The apparatus as set forth in claim 1 wherein said first structural lens comprises a spherical lens having a pre-determined spherical, optical correction power and said second, additive lens comprises a cylindrical lens having a pre-determined radial difference and defined cylindrical axis, said axis being aligned relative to said spherical lens for correction of astigmatism in conjunction with said spherical correction.

11. A method of treating bi-optical deficiencies of the eye in accordance with a prescription correction comprising the steps of:

determining a first, ophthalmic correction prescription for a first optical deficiency;

determining a second, ophthalmic correction prescription for a second optical deficiency;

providing a plurality of spectacle lenses having first ophthalmic corrections in pre-defined power graduations and surface curvature;

providing a plurality of additive, lenses having predefined radial differences in pre-defined graduations for affording a select optical prescription when applied to said structural lens, each of said additive lenses comprising a single, light refractive element formed of thin, pliable, light transmitting plastic material with a first opposed surface having a curvature generally different from and greater than the surface curvature of said first line and of sufficiently thin, cross-sectional area to afford pliability for flexibly conforming to said surface curvature of said spectacle lenses and bonding thereto;

selecting a first, spectacle lens comprising said determined first ophthalmic correction prescription;

selecting a second, additive lens having a radial difference which, when applied to said first lens, will provide said determined second opthalmic correction; and flexibly conforming said second pliable lens to said first lens and bonding said lenses together for correcting said bi-optical deficiency.

12. The method as set forth in claim 11 wherein said step of conforming said second lens to said first lens also includes aligning the respective axes of first and second lenses with one another for astigmatic correction.

13. The method as set forth in claim 11, wherein said first ophthalmic lens comprises a spherical correction and said second ophthalmic lens comprises a thin, pliable lens having a cylindrical correction.

14. The method as set forth in claim 11, wherein said first ophthalmic lens comprises a cylindrical correction and said second ophthalmic lens comprises a thin, pliable lens having a spherical correction.

15. The method as set forth in claim 11 and further including the steps of providing a plurality of additive lenses having basic prismatic corrections, selecting a prismatic additive lens, and bonding said selected prismatic lens to said first and second lenses.

16. Apparatus for ophthalmic use in treating optical deficiencies of the eye in accordance with a prescription correction, said apparatus comprising:

a first structural lens of pre-determined optical prescription and surface curvature for treating an ophthalmic eye deficiency;

a second additive lens of pre-determined radial difference for providing an additive, ophthalmic correction to said first lens and being formed of thin, pliable light transmitting plastic material of sufficiently thin, cross-sectional area to afford pliability for flexibly conforming to said surface curvature of said first lens and having first and second opposed surfaces of said select radial difference;

said first opposed surface of said additive lens being constructed of a curvature generally different from and greater than the curvature of said surface curvature of said structural lens and smoothly formed and bonded in flexible conforming relationship to said structural lens; and said second opposed surface of said additive lens being formed with a continuous, smoothly formed surface configuration comprising a single light refractive element having refractive properties which complement those of said first structural lens in accordance with said prescription correction.

17. A method of treating optical deficiencies of the eye in accordance with a prescription correction comprising the steps of:

determining an ophthalmic prescription for an optical deficiency;

providing a spectacle lens having ophthalmic correction and surface curvature;

determining an ophthalmic correction prescription for said spectacle lens to correct said optical deficiency;

providing a plurality of additive lenses in pre-defined radial difference graduations for providing additive ophthalmic corrections to said spectacle lens, each of said additive lenses comprising a single, light refractive element formed of thin, pliable, light transmitting plastic material constructed with a first opposed surface having a curvature generally different from and greater than that of the surface curvature of the spectacle lens and of sufficiently thin, cross-sectional area to afford pliability for flexibly conforming to said surface curvature of said spectacle lenses and bonding thereto;

selecting an additive lens having a radial difference which, when applied to said spectacle lens, will provide said determined ophthalmic correction; and conforming said second, pliable lens to said first lens and bonding said lenses together for correcting said optical deficiency.

* * * * *